April 15, 1941.　　　G. F. DE WEIN　　　2,238,430
SECTIONALIZED V BELT
Filed Jan. 8, 1940
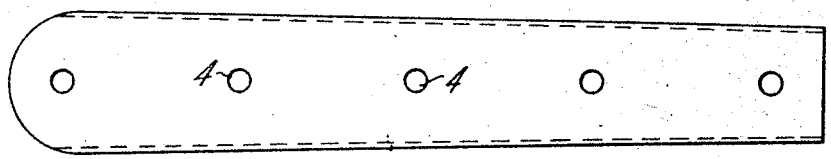 
Fig. 3　　　Fig. 4
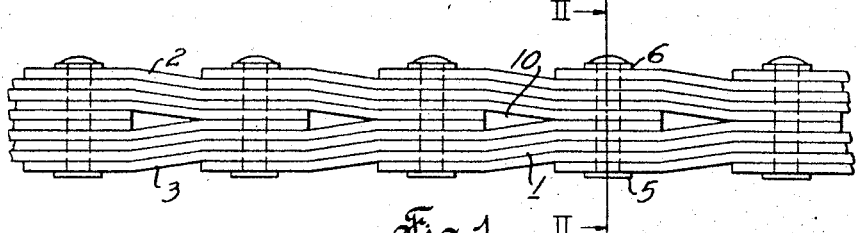 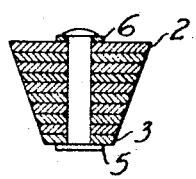
Fig. 1　　　Fig. 2
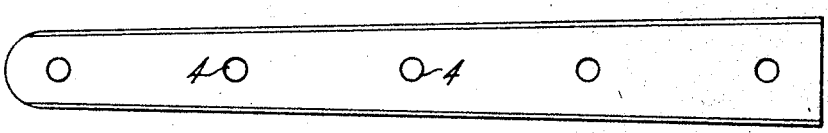 
Fig. 5　　　Fig. 6
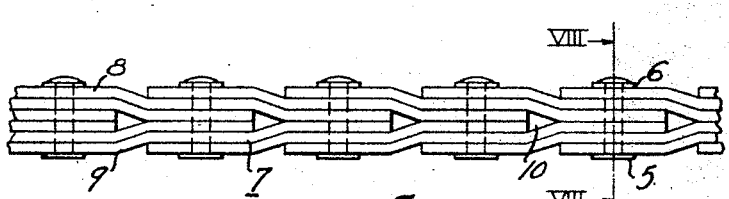 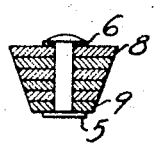
Fig. 7　　　Fig. 8
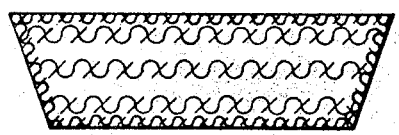
Fig. 9
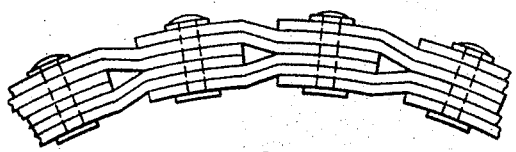
Fig. 10
Inventor Patented Apr. 15, 1941

2,238,430

UNITED STATES PATENT OFFICE 2,238,430

SECTIONALIZED V BELT

George F. De Wein, Milwaukee, Wis., assignor to Allis-Chalmers Manufacturing Company, Milwaukee, Wis., a corporation of Delaware Application January 8, 1940, Serial No. 312,803

4 Claims. (Cl. 74—233)

The invention relates to V belts and in particular to improved sectionalized V belts.

An object of the invention is to provide an improved sectionalized belt structure.

Sectionalized V belts are often used on sheaves located intermediate of bearings and where replacing of belts would require removing either one or the other of the shaft bearings in order to put on a continuous or molded V belt.

Heretofore sectionalized V belts have been made of short sections of laminar rubber impregnated fabric placed in a single overlapping arrangement, each section having a side contacting surface running the full depth of the belt. Two or more holes are provided in each section so that the sections may be secured together loosely by rivets to form a continuous belt. When a load is applied to a belt of this construction the rivets have a tendency to tilt due to the single overlapping. This tilting of the rivets permits the individual sections of the belt to slide upon each other and cause the belt to lengthen. It is then necessary to remove one or more of the individual sections and rivets to shorten the belt and thus restore the belt to its original effective length. When the rivets are tilted due to a load placed on the belt, the fabric near the holes is compressed and in time, due to the continuous changes in load, cause the enlargement of the hole which later causes failure of the belt. Some attempts have been made to obviate this difficulty by tightly clamping the overlapping laminations together by the use of bolts or other means. While this method restores the operation of the belt, it does so at the expense of taking up the belt and with the rivets cocked over.

It is therefore the main object of the invention to provide a sectionalized V belt in which relative sliding movement between the sections and accompanying cocking over of the rivets are eliminated, thereby preventing elongation of the belt due to this cause.

Another object of the invention is to provide a sectionalized V belt which is ventilated to permit more effective cooling of the belt.

A further and more specific object of the invention is to provide a sectionalized V belt which, when endless and of circular formation, is unstressed.

A still further object of the invention is to provide a sectionalized V belt in which, when mounted on a pair of pulleys, the bending stresses set up are distributed over the entire belt.

These and other objects and advantages of the invention will be apparent from the following description and accompanying drawing in which like reference numerals designate like parts in the various views:

Fig. 1 is a side elevation of a portion of a belt showing five rivet link sections;

Fig. 2 is a sectional view on line II—II of Fig. 1;

Fig. 3 is a plan view of one of the outer laminations of the belt shown in Fig. 1;

Fig. 4 is an end view of Fig. 3;

Fig. 5 is a plan view of one of the inner laminations of the belt shown in Fig. 1;

Fig. 6 is an end view of Fig. 5;

Fig. 7 is a side elevation of a portion of a belt showing three rivet link sections;

Fig. 8 is a sectional view taken on line VIII—VIII of Fig. 7;

Fig. 9 is an enlarged sectional view of one of the laminar sections; and

Fig. 10 is a side elevational view of a modified construction of the invention showing the rivets on radial lines.

As shown in Fig. 1, numeral I designates a V belt composed of outer laminations or links 2 and inner laminations or links 3. The outer laminations 2 are made of rubber impregnated fabric, as shown in Fig. 9, or other material of suitable strength and are cut or molded in a tapered form, as shown in Fig. 3. The inner laminations 3 are made of a similar material and are cut or molded in a tapered form as shown in Fig. 5. Each of the laminations 3 and 4 have a corresponding series of equally spaced holes 4 longitudinally of the laminations. As shown in Fig. 1, outer laminations 3 and inner laminations 4 constitute V shaped sets or divergent pairs of outer and inner sections. These pairs of outer and inner sections are inserted into each other in overlapped relation. Rivets 5 with washers 6 secure the outer and inner laminations together in overlapped relation.

A modification of the invention is shown in Figs. 7 and 8 and differs from the construction as shown in Figs. 1 and 2 in that each outer and inner section 8 and 9, respectively, has only three holes instead of five holes, as shown in Fig. 1. The number of holes in each series in the outer and inner sections is determined by the number of laminations to be secured by each rivet and the thickness of the belt desired. The belt 1 of Fig. 1 has ten layers or laminations secured by each rivet and each lamination 3 and 4 has a series of five holes. The belt 7 shown in Fig. 7 has six laminations secured by each rivet and each lamination has a series of three holes. When a belt of the above construction is used in connection with a driving and a driven pulley and power is being transmitted by the belt, the tension in the belt between the pulleys is distributed evenly at opposite sides and throughout the length of the connecting rivets. Any cocking tendency present in the outer sections which would tilt the rivets in one direction is counteracted by a cocking tendency present in the inner section which tends to tilt the rivets in the opposite direction, and the rivets remain in their original position and will not elongate the holes 4 and will not require shortening to maintain the proper length of belt. This beneficial result is accomplished by having the outer and inner lapped laminations symmetrically arranged with respect to the pitch line of the belt, thus distributing the tension on opposite sides of the pitch line.

In making a belt according to this invention, the spacing of the series of holes in the inner laminations is somewhat shorter than the spacing of the series of holes in the outer laminations, because the spacings between the holes 4 are progressively shorter beginning at the larger ends of the links, the difference of these spacings being such that when the belt is assembled in unstressed condition the belt will assume a circular formation, the rivets lying on radial lines of the circle, as shown in Fig. 10. The stresses in a belt made in this circular form when passing around a pulley will be less than those in a belt made on a straight line and then assembled in an endless belt. This is due to the fact that the belt shown in Fig. 10 has an original curve when assembled.

Referring to Fig. 10 it is obvious that when a belt made in this manner is used on a pair of pulleys, the diameter of the pulleys will necessarily be smaller than the original diameter of the circular unstressed belt. It will be seen that the portion of the belt passing over the pulleys will be caused to take a curvature of less radius than the original unstressed belt, thus tensioning the outer links and that the portion of the belt between the pulleys will be caused to straighten out, thus tensioning the inner links. The alternate shifting of the working stresses from the outer links where the belt contacts the pulleys to the inner links where the belt runs between the pulleys, causes the links to be subjected successively to the working stresses and successively relieves the stresses set up in the links, all of which adds to the life of the belt. The life of the belt is also increased due to the fact that the belt is made so that, when in unstressed condition, it is in the form of a circle. This reduces the amount of bending necessary to conform to the curvature of the pulleys as compared to the amount of bending of a belt made originally in straight line formation. The bending from circular formation to the pulley circumference is not only less than before at the pulleys, but is furthermore distributed over the entire length of the belt because at the straight portion of the belt the bending is negative from the circular shape to the straight line shape. It follows that the "buckling" of the links opposite those in tension is distributed throughout the belt length and is less than before.

Referring to Figs. 1 and 7, it is pointed out that by constructing the belt in outer and inner sections 2 and 2 and 8 and 9, respectively, that triangular holes or openings 10 are formed, these openings permitting the flow of air through the belt, thus cooling the belt. By providing holes in the belt, the fabric in the belt may be kept at a lower temperature which is desirable as the rubber in the belt will get sticky if the heat is too excessive.

Belts made as hereinabove described may be used any place other V belts are employed, as on single or multiple pulleys, and they are especially suitable for use where the pulleys are arranged in a machine where endless belts cannot be used without dismantling the machine.

It should be understood that it is not intended to limit the invention to the exact details of construction as herein shown and described, for various modifications within the scope of the claims may occur to persons skilled in the art.

It is claimed and desired to secure by Letters Patent:

1. A sectionalized V belt comprising outer tapered links arranged in overlapping relation and having a series of spaced holes, and inner tapered links arranged in overlapping relation and having a series of spaced holes, said spacings of said holes in said inner links being shorter than the spacings of said series of holes in said outer links, said outer and inner links arranged in divergent pairs having portions near one end in direct contact with each other, and rigid means passing through said holes for securing together said outer and inner overlapping links.

2. A sectionalized V belt comprising outer taper links arranged in overlapping relation and having a series of spaced holes, and inner tapered links arranged in overlapping relation inversely to the overlapping relation of the outer links and having a series of spaced holes, the spacing of said series of spaced holes in said links being of successively decreasing dimension from the radially outer ends of said links to the radially inner ends of said links, the larger spacing between holes of said inner tapered links being less than the smaller spacing between holes of said outer tapered links and rigid means passing through said holes securing said outer and inner links in said overlapping relation.

3. A sectionalized V belt comprising pairs of substantially coextensive outer and inner flexible links abutting at one end of each and diverging from said abutting ends, said links being provided with openings in radial alinement occurring when the belt is curved and unstressed, and radial connectors passing through said openings and connecting said links together.

4. A sectionalized arcuate V belt comprising outer flexible links overlapping each other and arranged outward of the pitch diameter of the arc of said V belt, inner flexible links overlapping each other and arranged inward of the pitch diameter of the arc of said V belt, each outer link being paired with an inner link, the links of each said pair being arranged adjacent each other at one end thereof and diverging therefrom whereby all said links are arranged in the form of an arcuate herringbone, said links having apertures in radial alinement occurring when said belt is curved and unstressed, and radial fastening means within said apertures and connecting said links together.

GEORGE F. DE WEIN.